(No Model.)  6 Sheets—Sheet 1.
C. P. OUDIN.
MAIL MARKING MACHINE.
No. 604,689. Patented May 24, 1898.
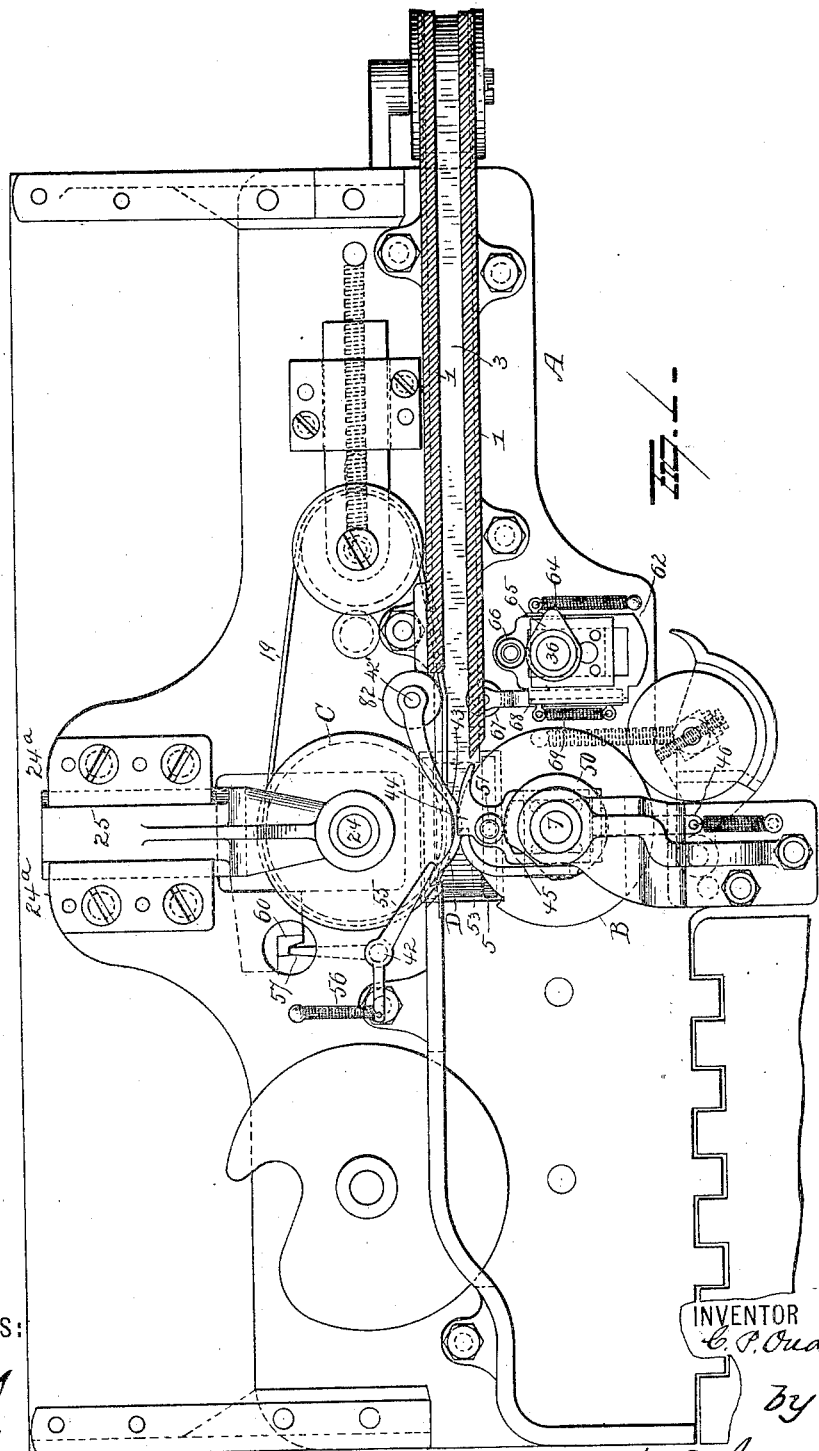

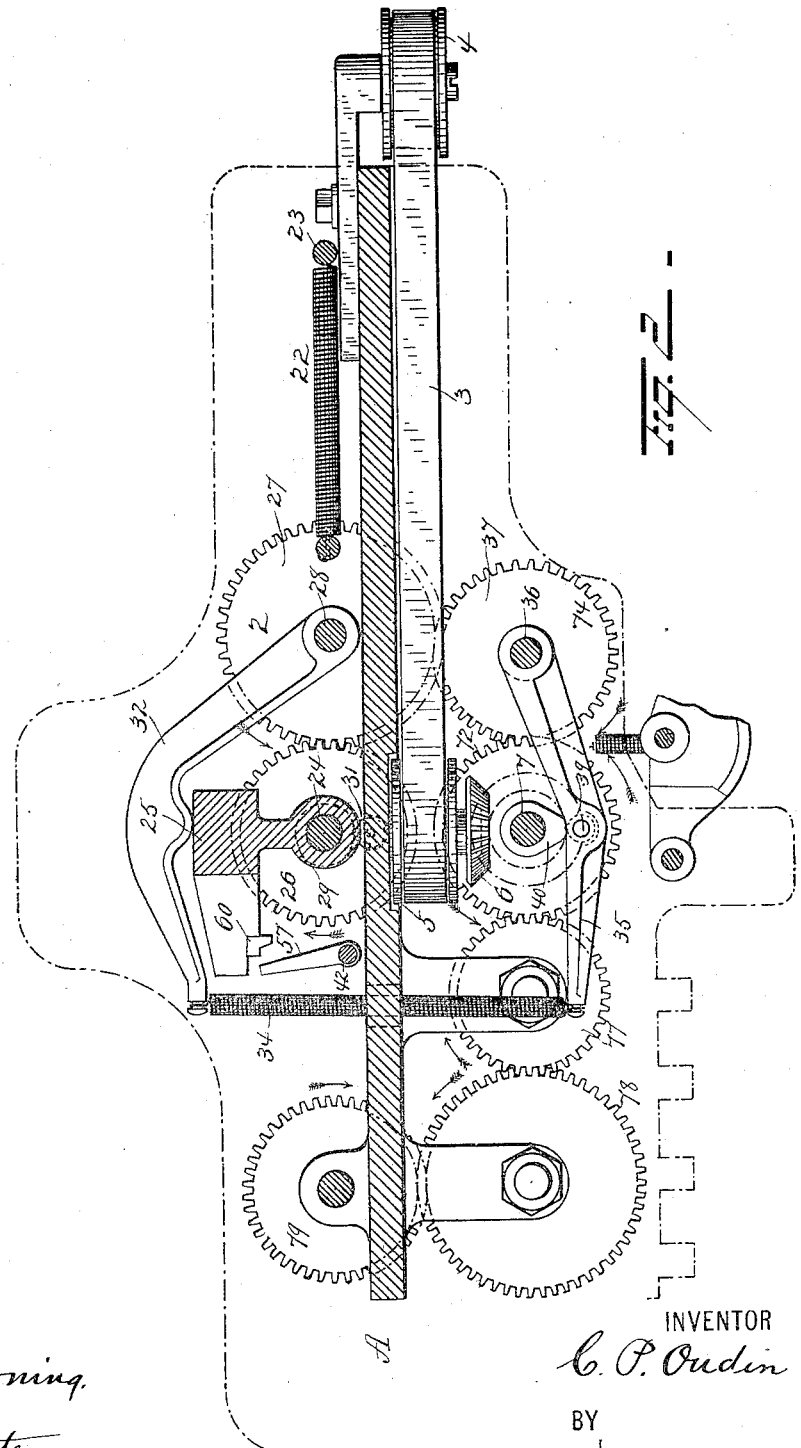

(No Model.) 6 Sheets—Sheet 3.
C. P. OUDIN.
MAIL MARKING MACHINE.
No. 604,689. Patented May 24, 1898.
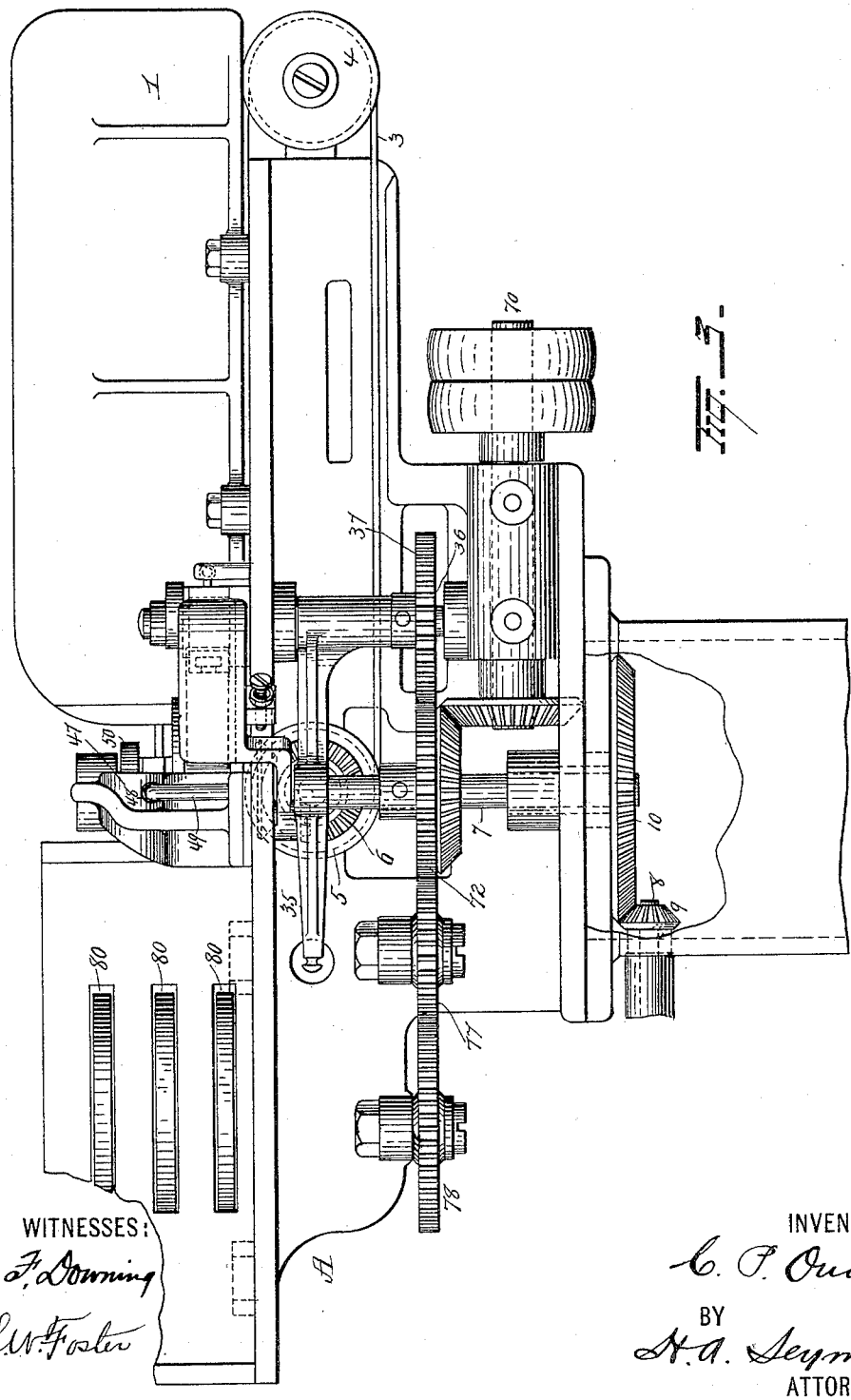
WITNESSES:
G. F. Downing
S. W. Foster
INVENTOR
C. P. Oudin
BY
H. A. Seymour
ATTORNEY (No Model.) 6 Sheets—Sheet 4.
C. P. OUDIN.
MAIL MARKING MACHINE.
No. 604,689. Patented May 24, 1898.
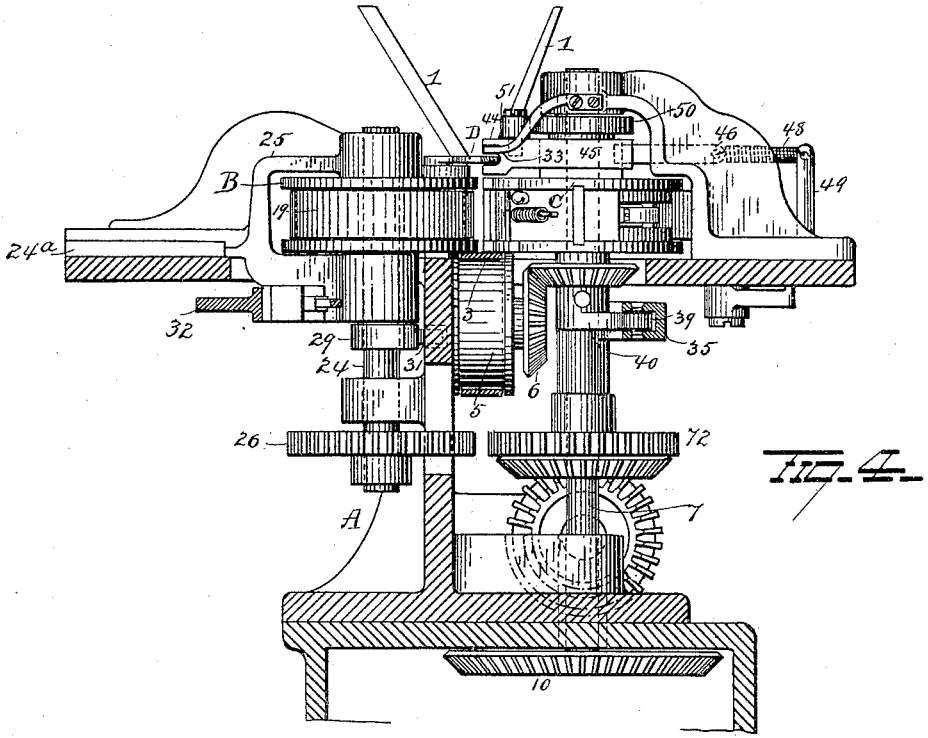
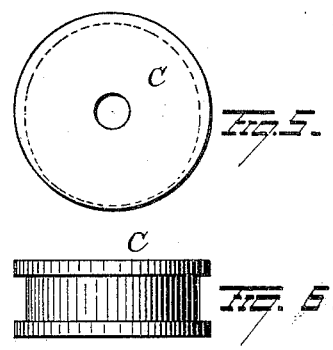
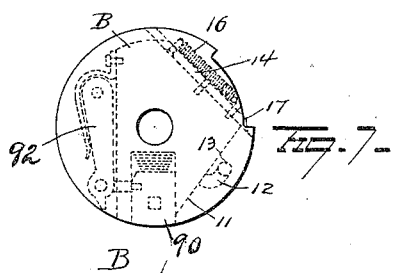
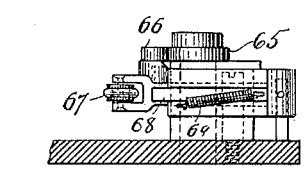
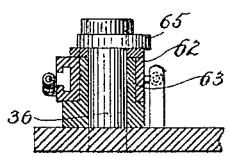
WITNESSES:
G. F. Downing.
S. V. Foster
INVENTOR
C. P. Oudin
BY
H. A. Seymour
ATTORNEY (No Model.) 6 Sheets—Sheet 5.
C. P. OUDIN.
MAIL MARKING MACHINE.
No. 604,689. Patented May 24, 1898.
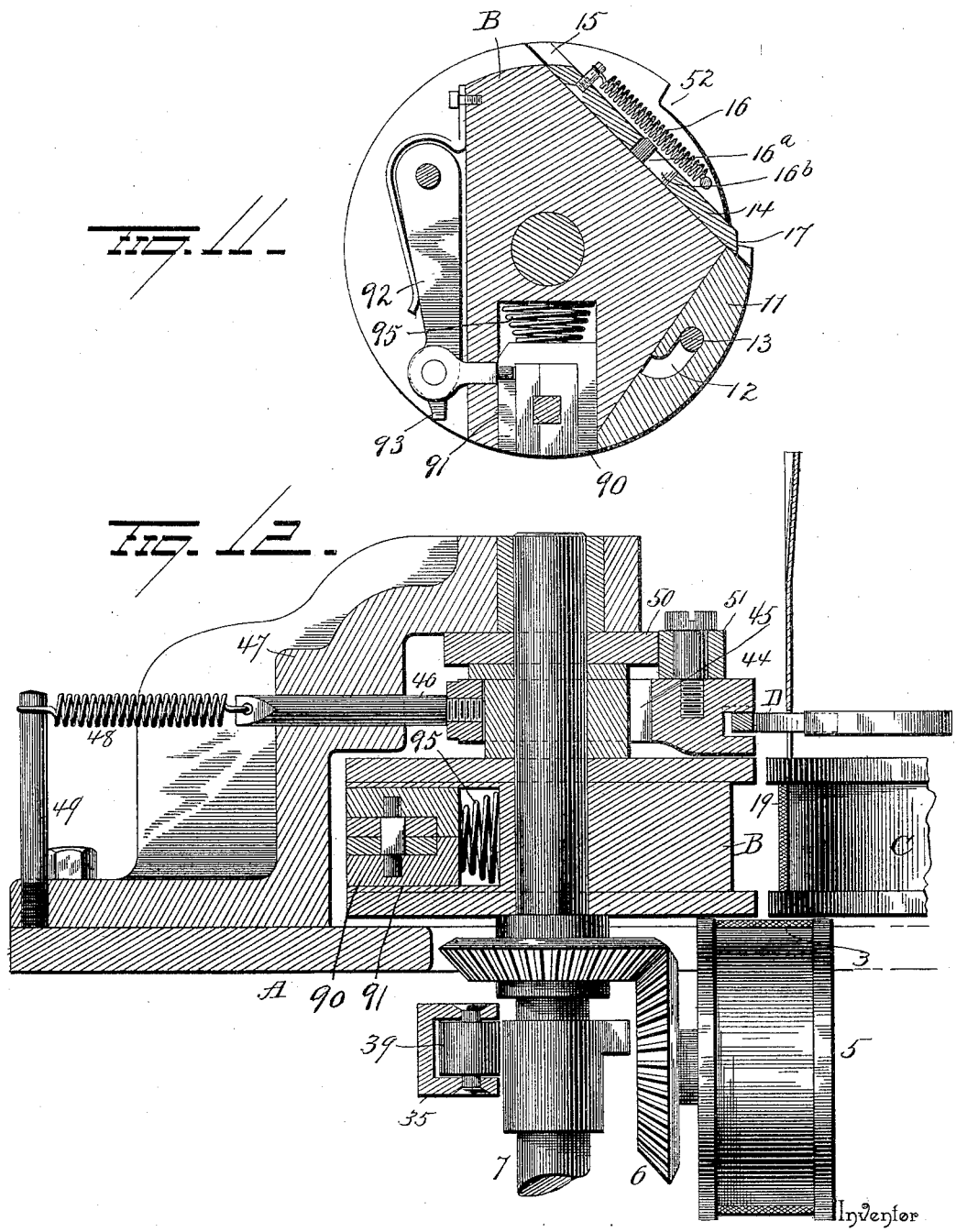

(No Model.)  6 Sheets—Sheet 6.
C. P. OUDIN.
MAIL MARKING MACHINE.
No. 604,689.  Patented May 24, 1898.
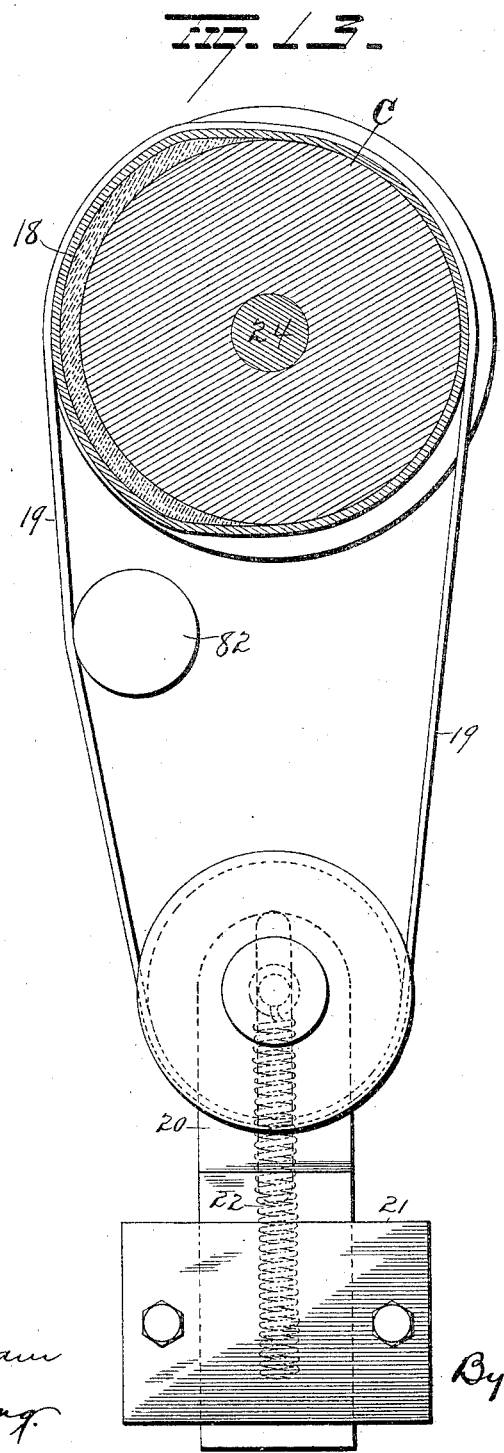
Witnesses
E. J. Nottingham
G. F. Downing
Inventor
C. P. Oudin
By H. A. Seymour
Attorney

UNITED STATES PATENT OFFICE.

CHARLES P. OUDIN, OF NEW YORK, N. Y., ASSIGNOR, BY MESNE ASSIGNMENTS, TO THE ACME SUPPLY COMPANY, OF NEW YORK.

MAIL-MARKING MACHINE.

SPECIFICATION forming part of Letters Patent No. 604,689, dated May 24, 1898.

Application filed June 22, 1897. Renewed May 2, 1898. Serial No. 679,490. (No model.)

*To all whom it may concern:*

Be it known that I, CHARLES P. OUDIN, of New York, in the county of New York and State of New York, have invented certain new and useful Improvements in Mail-Marking Machines; and I do hereby declare the following to be a full, clear, and exact description of the invention, such as will enable others skilled in the art to which it appertains to make and use the same.

My invention relates to an improvement in mail-marking machines.

Among other objects the principal one to be derived by the present construction is to simplify and strengthen the parts employed and lessen the number, so that the liability of breakage or getting out of order is reduced without in any wise impairing the efficiency of the machine, but, on the contrary, deriving superior results in every respect.

With this object in view the invention consists in certain novel features of construction and combinations of parts, which will be hereinafter described, and pointed out in the claims.

In the accompanying drawings, Figure 1 is a plan view, partly in section. Fig. 2 is a horizontal section. Fig. 3 is a view in elevation. Fig. 4 is a transverse vertical section. Figs. 5 and 6 are views of the impression-cylinder. Figs. 7 and 8 are views of the printing-cylinder. Figs. 9 and 10 are views in side elevation and section, respectively, of the sliding feed-roller and connected parts; and Figs. 11, 12, and 13 are enlarged detail views of parts of the machine.

A represents the main frame of the machine, and 1 indicates the hopper, into which the letters or postal cards to be canceled are fed by hand in the usual manner. In the bottom of this hopper the endless conveyer-belt 3 travels, it being carried, as hitherto, on rollers 4 5. The latter has connected with it a bevel-gear 6, by means of which it is driven.

At the inner end of the conveyer-belt the several parts for manipulating and canceling are located, and as these in the main constitute the novel features of my present invention they will now be described in detail.

B is the printing-cylinder. This cylinder is keyed on a vertical shaft 7, and the latter is driven continuously by the main drive-shaft 8 through suitable mechanism—as, for instance, the bevel-gears 9 and 10. This printing-cylinder B carries the cancellation-block 11, which marks or cancels the stamp. This block may of course have any mark formed thereon. The special feature of novelty in connection with it consists in the facility with which it is attached and detached. This is as follows: The block is provided in its inner face with the open L-shaped slot 12, and the printing-cylinder has a rigid bolt or post 13, which this slot receives when the block is slipped in place in the cylinder. The direction of the L-shaped slot is such that it holds the block snugly against the side of the cylinder when it is slid endwise as far as it will go. The block is in this way held perfectly solid. To retain it in place, a spring-actuated slide 14 is connected with the printing-cylinder. This slide is held in place by guides 15 15 at its edges. The spiral spring 16 forces it yieldingly forward, and a pin $16^a$ in slot $16^b$ limits its movement. The forward end of the slide is beveled, as at 17, where the block 11 strikes it as it is inserted in place, the beveled end facilitating its slipping out of the way. To remove the block, this slide is merely forced aside and the block removed, and to reinsert the block it is placed in position so that the mouth of the L-shaped slot 12 is opposite the post 13. The block is then slid forward and forced slightly inward against the beveled end of the slide 14 to its place, the slide dropping back temporarily, as explained, until the block reaches its seat and then returning immediately to its normal position to lock the block in place.

The numeral 90 indicates the dating-stamp. This stamp fits in a peripheral socket 91 in the cylinder B, where it is removably held in place by the pivoted spring-actuated catch 92. The catch has a thumb-piece 93 on its outer or free end by means of which it is swung outward. A spring 95 forms a seat for the stamp, its sole function being to eject the stamp when the catch is swung out of engagement with the stamp.

Opposite the printing-cylinder B is located the rotary impression-cylinder C, between which and the printing-die and block the envelop or postal is held when the marking is done. This cylinder C is padded, as at 18, at the point in its side which meets the printing-dies. This gives it a slightly eccentric outline, as indicated in the drawings, and as the vertical carrying-belt 19 travels over this pad with each revolution of the cylinder and as the cylinder also slides back and forth with every revolution provision must be made for automatically taking up the slack in the belt 19 during the sliding movement and more especially during the transit of the pad from one lead of the belt to the other. This is provided for by a sliding take-up or belt-tightener 20, which carries a roller, over which the vertical belt 19 also passes. This take-up slides in a block 21, and a spiral spring 22, connected with the main frame, and a depending pin 23, reaching through a slot in the frame, applying the necessary tension to the belt. In this way the vertical belt 19 is always kept taut.

The shaft 24, on which the impression-cylinder C is secured, is journaled in a bracket 25, and this bracket slides in guides 24ᵃ 24ᵃ on the main frame. On the lower end of this shaft is a gear-wheel 26, which intermeshes with and receives its motion from a gear-wheel 27 on shaft 28. A cam 29 is secured on shaft 24, and this bears against an antifriction-roller 31 during a portion of each revolution of the shaft, the office of the cam being to force the shaft 24, with its connected parts, outward during a portion of its revolution.

It will be observed that the two cylinders B and C, besides their other functions, constitute gripping-rolls to hold the envelop or card while it is undergoing the marking operation. This impression-cylinder C is forced against the printing-cylinder by spring-pressure in the following manner: A lever 32 is pivoted for convenience merely on shaft 28, and it bears against the bracket 25. To the opposite end of this lever 32 a stiff spiral spring 34 is connected, and this spring extends forward to another lever 35, pivoted for convenience on shaft 36, whose gear-wheel 37 drives gear 27 on shaft 28. This lever 35 has an antifriction-roller 39 thereon, and a cam 40 on a shaft 7 operates upon this roller 39 to vibrate the lever during a portion of the operation. The function of this lever 35 is to automatically increase the tension of the spring 34 and through it about double the pressure of the impression-roller C upon the printing-dies during the marking operation. As soon as the marking is done only a slight pressure is required. The parts are so timed in operation that at this moment—namely, when the marking is done—the cam 40 escapes roller 39, thus letting the lever 35 drop back in obedience to the pull of the spring upon it. This reduces the tension on the spring to a considerable degree, as the pressure now required is slight compared with that necessary during the momentary operation of marking. By this provision the objectionable noise and clatter incident to the cylinders striking together just after the passage of each card or envelop are prevented. This impression-cylinder C is tripped by the card or envelop in passing, as will be explained. D represents this trip. It is pivoted to a post 42' at one side of the hopper, and its free end curves into the path of the card or envelop, as shown at 43. This trip remains perfectly rigid up to a certain point, and coöperating with it to temporarily stop the card or envelop is a sliding spring-actuated bifurcated foot 44. This foot 44 is located immediately over the printing-cylinder, and its rear end is in the form of a yoke 45, which straddles the shaft 7, which carries the printing-cylinder B. A tail-bolt 46 extends rearward through the casting 47, which forms a bearing for this shaft, and a spiral spring 48 extends from the end of this tail-bolt to a post 49 on the casting. This bolt prevents the foot 44 from turning laterally, and the spiral spring tends normally to slide the foot outward or rearward; but to counteract this tendency a cam 50 on the shaft 7 is provided, it acting upon the antifriction-roller 51 on the foot to retain the latter outward, except as the foot recedes to let the card or envelop into the recess 52 in the edge of the printing-cylinder B and against the stop 53 just prior to operating the trip to cause the pressure of the card or envelop against the marking-dies. At this moment the foot 44 slides forward, forcing the edge of the card or envelop beyond the stop and simultaneously forcing the trip, which up to this period has been rigid, to one side. The effect of this is to strike an arm 55, lying in its path. This arm is pivoted on the main frame, where it is yieldingly held by a spring 56 against the free end of the trip. A trigger 57, connected with this arm, operates to lock and unlock the slide-bracket 25 by engaging or disengaging the shoulder 60 on the slide-bracket.

To go back a little at this point, mention must be made of the feed-roller and its connected mechanism. This roller gives the final thrust to the card or envelop, forcing it home against the stop. Surrounding the upper end of a shaft 36 is a yoke 62. This yoke has an elongated slot which receives a block 63. A spring 64, connected with this yoke and with the main frame, normally throws it in one direction, while cam 65 on the shaft 36, operating against roller 66, forces it forward or in the opposite direction or toward the hopper. The feed-roller 67 is carried by this yoke; but to allow for different thicknesses of envelops it has a tongue-and-groove sliding connection with the yoke, as at 68, it being held yieldingly forward by the spiral spring 69.

Any suitable gearing may be employed. Ordinary gear-wheels are shown for communicating motion from one part to another; but worm-gears or any other suitable mechanism for accomplishing the purpose could of course be employed without in any way departing from the spirit and scope of the invention, which resides mainly in the working mechanism and connected parts for insuring the perfect operation of the marking mechanism. Different varieties of driving mechanism might also be employed, as foot-power, steam-power, or, still better, an individual electric motor of one-twelfth horse-power may be used for the purpose, as an ordinary incandescent-light current is sufficient to run it.

The operation of the machine will now be briefly described.

Power is applied through the drive-shaft 70 directly by means of a belt running over pulley 71 if foot or steam power is used, but if an electric motor the additional drive-shaft 8 is employed, in which event power is communicated through bevel-gears 9 and 10 to shaft 7 to drive the printing-cylinder B, turn the cam 40 to operate lever 35, and through gear 72 on said shaft 7 to gear-wheel 37 on shaft 31 to operate the cam 65, which controls the feed-roller 67, which gives the final thrust to the card or envelop. From gear 37 motion is communicated to gear-wheel 27 and from the latter to gear 26 on shaft 24. In the other direction motion is imparted from gear 72 through gears 77 and 78 to gear 79, which operates the packing-disks 80 80. The marking operation is as follows: The cards or envelops are dropped by hand into the hopper up side down with stamp toward the operator. Immediately upon striking the bottom of the hopper they are fed forward by the conveyer-belt 3, which travels forward continuously. The card or envelop is carried forward until it strikes the trip, which at that time is rigid, thereby stopping the card or envelop long enough for the printing-cylinder to turn to the proper position to operate upon it, providing it does not happen to be in proper position when the card or envelop arrives, which is possible, but not absolute. When they do stop, the delay is but a fraction of a second and therefore hardly worth consideration and is merely mentioned to make the operation perfectly clear. The printing-cylinder, which continues to turn, arrives at a position in which the forward edge of its notched periphery is nearly opposite the forward edge of the envelop. Just at that time the bifurcated spring-actuated foot 44 begins to recede. The cam 29 simultaneously forces the bracket 25 back until the shoulder 60 disengages the trip. At this moment the feed-roller advances into the hopper and gives a positive forward thrust to the card or envelop, pinching the latter, as it does, between itself and the vertical conveyer-belt where it runs over the idler 82. These two parts coöperate to force the card or envelop against the stop, thus gaging it to receive the mark at the right point. The feed-roller is now withdrawn, having accomplished its mission, and the bifurcated foot pushes the envelop off of the stop and laterally against the trip until the trigger 57 clears the shoulder 60. By this time the cam 29 has turned to one side and the cam 40 has reached its extreme outer stroke, carrying lever 35 with it, applying the maximum tension upon spiral spring 34, which through lever 32 and bracket 25 forces the impression-cylinder inward with its pad snugly against the back of the card or envelop, pinching it against the printing-dies while the marking is being accomplished. A continuation of the motion from this point results in a relaxing of the tension on spring 34, as previously explained, and the final discharge of the card or envelop by the action of the cylinders upon it, after which it is operated upon by the packing-disks. The movement of the card or envelop passes beyond the trip, the latter springs forward, and its trigger 57 drops into position to engage shoulder 60, which it does as soon as cam 29 carries bracket 25 back far enough. The parts are in this way set for a repetition of the marking process. This operation repeats itself several times a second, so that the speed of the parts is more than adequate to accommodate the most rapid hand-feeder.

It will be observed that there are no delicate or intricate mechanisms in the entire machine. The number of the parts is reduced to a minimum and they all are heavy and strong, so that there is little or no danger of their getting out of order. On account of the fewness of the parts and the comparative simplicity of construction the friction is reduced, so that very little power is required to run the machine, and the parts to be oiled and kept in order are greatly lessened.

Having fully described my invention, what I claim as new, and desire to secure by Letters Patent, is—

1. The combination with printing and impression cylinders, a stop and trip, of a sliding spring-actuated foot located above one of the cylinders for moving the article to be marked from the stop and for operating the trip, and means on one of the cylinder-shafts for moving the foot.

2. The combination with printing and impression cylinders, of a rigid stop, a trip, a sliding bifurcated foot located over one of the cylinders, a spring for pulling the foot in one direction and a cam on one of the cylinder-shafts for forcing the foot positively in the other direction.

3. The combination with printing and feeding mechanism, of a stop, a shaft having a cam thereon, a slide having a foot adapted to be forced in one direction by the cam, a tail-bolt extending rearward from the foot through a solid part of the machine and a spring connecting said bolt to a rigid part of the machine.

4. The combination with a printing and impression cylinder, and conveyer-belts, of a trip, a stop, a sliding spring-actuated feed-roller, and a sliding spring-actuated foot for throwing the card or envelop from the stop and operating the trip.

5. The combination with rotary printing and impression cylinders, a feed-roller, and a sliding bracket carrying one of the cylinders, of a trip operated by a passing card or envelop to release the bracket, and means for automatically applying a variable pressure to the bracket and through it to the cylinder carried thereby.

6. The combination with a rotary printing-cylinder, rotary impression-cylinder, a sliding feed-roller, and sliding foot a sliding bracket carrying one of these cylinders, of a trip operated by a passing card or envelop to release the bracket and means for automatically applying a variable pressure to the bracket and through it to the cylinder carried thereby.

7. The combination with two rotary cylinders, one movable and means for applying a variable pressure to the movable cylinder, of a sliding spring-actuated foot-feeding mechanism and trip mechanism.

8. The combination with rotary printing and impression cylinders, one of which is movable, of a sliding spring-actuated feed-roller, a sliding foot, trip mechanism, cam moving the movable cylinder in one direction, and means for applying a variable pressure in the other direction.

9. The combination with printing and impression cylinders one of which is movable, the shaft on which one cylinder is secured having two cams, of a sliding spring-actuated foot operated by one of these cams, a lever operated by the other, a spring extending from this lever and connected with the movable cylinder and adapted to apply a variable pressure thereto, and feed, stop and trip mechanism.

10. The combination with a printing-cylinder having a transverse post therein, of a cancellation-block having a bayonet or L-shaped slot formed therein and adapted to receive this post, and a slide constructed and adapted to lock the block in this post.

11. The combination with a printing-cylinder having a post therein, of a cancellation-block having an L-shaped slot opening into the inner face and adapted to receive and let the post into its innermost end whereby the block is held in place, and a spring-actuated slide having sliding connection with the cylinder in rear of the cancellation-block and adapted to normally extend over the end of the latter whereby to lock it in place on the cylinder.

12. The combination with feed mechanism and a printing-cylinder, of a sliding spring-actuated foot located over the cylinder, a cam on the cylinder-shaft for moving said foot, a stop and trip mechanism.

In testimony whereof I have signed this specification in the presence of two subscribing witnesses.

CHARLES P. OUDIN.

Witnesses:
C. S. DRURY,
VERNON E. HODGES.